United States Patent [19]
Taub et al.

[11] 4,228,246
[45] Oct. 14, 1980

[54] MANUFACTURE OF FLUOROCARBON EXPANDED POLYSTYRENE

[75] Inventors: Bernard Taub, Williamsville; Daniel F. Harnish, Orchard Park; Philip E. Jones, Snyder, all of N.Y.

[73] Assignee: Allied Chemical Corporation, Morris Township, Morris County, N.J.

[21] Appl. No.: 635,461

[22] Filed: Nov. 26, 1975

[51] Int. Cl.² ............................................. C08J 9/14
[52] U.S. Cl. ............................. 521/98; 264/DIG. 5; 521/146; 521/910
[58] Field of Search .................. 260/2.5 E, 2.5 B; 264/DIG. 5; 521/98, 146, 910

[56] References Cited
U.S. PATENT DOCUMENTS

| | | | |
|---|---|---|---|
| 3,900,433 | 8/1975 | Taub et al. | 260/2.5 E |
| 3,914,191 | 10/1975 | Scott | 260/2.5 B |

Primary Examiner—Morton Foelak
Attorney, Agent, or Firm—Jay P. Friedenson

[57] ABSTRACT

Improved polyolefin foams, particularly polystyrene foams, and improved extrusion processability thereof are obtained by employing as blowing agent a mixture of from about 3 to about 70 weight percent monochloromonofluoromethane and from about 97 to about 30 weight percent of dichlorodifluoromethane.

6 Claims, No Drawings

MANUFACTURE OF FLUOROCARBON EXPANDED POLYSTYRENE

This invention relates to the preparation of polyolefin foams, particularly polystyrene foam, by extrusion of same in the presence of a blowing agent.

It is well known in the art to prepare a variety of polyolefin foams by blending molten or heat plasticized polyolefin resins with a volatile foaming agent or blowing agent and extruding same from a pressurized chamber through an orifice through a zone of lower pressure. Upon release of the pressure the normally gaseous volatile foaming agent vaporizes and expands the polyolefin to form a stable cellular body.

A variety of volatile blowing agents have been employed in preparation of such foams. n-Pentane has been proved useful particularly in connection with the blowing of polystyrene foams; however, n-pentane is flammable and for this reason elaborate and expensive precautions must be taken when it is used. Furthermore, the residual flammable n-pentane content in the product limits the product's usefulness in certain applications.

Various volatile halogenated hydrocarbons which are non-flammable have been attempted to be used as blowing agents for polyolefin foams, however, most of the halogenated hydrocarbons tested have not proved to be capable of making foam with good properties. Such as the case, for example, with methylene chloride. Similarly, trichlorofluoromethane proved to be too soluble in polystyrene, for example, and results in foam which has a non-uniform and excessively large cell size.

Dichlorodifluoromethane has been used commercially for the preparation of a variety of polyolefin foams, including polyethylene and polystyrene. However, particularly in the case of polystyrene, dichlorodifluoromethane has proved to be unduly insoluble, thus resulting in unduly rapid foaming and foam having excessively small cell size. Furthermore, the rapid foaming and poor solubility characteristics of dichlorodifluoromethane cools the product too soon after the extrusion which results in excessive "cold working" i.e. at temperatures near or below its solidification temperature. In addition, it has been found that large amounts of energy must be used to process polystyrene foam which utilizes dichlorodifluoromethane as the blowing agent since extrusion processability is poor.

U.S. Pat. No. 3,539,473 discloses the use of certain blends of iso- or n-pentane and dichlorodifluoromethane as blowing agents for certain polyolefin foams.

It is apparent that there is a need in this art for novel volatile blowing agents or blowing agent blends which are capable of producing polyolefin foams with good properties and with good extrusion processability.

BRIEF DESCRIPTION OF THE INVENTION

In accordance with this invention it has been found that in the method for the preparation of polyolefin foams comprising blending a thermoplastic polyolefin with a nucleating agent and a volatile foaming agent, and extruding said composition into a region of lower pressure to cause foaming; good foam properties and good extrusion processability are achieved by employing as the volatile foaming agent a mixture comprising from about 3 to about 70 weight percent monochloromonofluoromethane and from about 97 to about 30 weight percent dichlorodifluoromethane.

DETAILED DESCRIPTION OF THE INVENTION

The polyolefin resin may be any of the well known resins of this type which are known to be extrudable by the technique described above. These are numerous and well known in the art. An exemplary class of a suitable polyolefin resin in accordance with the invention are polymers of monovinyl aromatic compounds of the formula Ar—CH=CH$_2$ wherein Ar is an aromatic hydrocarbon radical of the benzene series or an aromatic halohydrocarbon radical of the benzene series with up to about 10 weight percent of another readily copolymerizable olefinic compound. This class of resins is described in more detail in U.S. Pat. No. 3,539,473 and, as therein noted, includes such alkenyl aromatic resins such as the solid homopolymers of styrene, vinyltoluene, isopropylstyrene, ar-fluorostyrene, solid copolymers of two or more of such monovinyl aromatic compounds and said copolymers of one or more of such monovinyl aromatic compounds and from about 1 to 10% by weight of other readily copolymerizable olefinic compounds such as acrylonitrile and methyl methacrylate or ethyl acrylate.

Other examples of suitable polyolefin resins in accordance with the invention include the various ethylenic resins including the ethylene homopolymers such as low density polyethylene and high density polyethylene and ethylene copolymers such as ethylene-vinyl acetate copolymer, ethylene-propylene copolymer, ethylene-vinyl chloride copolymer and ethylene-acrylonitrile copolymer. Generally the ethylene content of such homopolymers or copolymers should be above about 50% by weight. This class of polyolefin resin is described in more detail in U.S. Pat. No. 3,657,165.

The preferred class of polyolefin resin is the monovinyl aromatic compound class described above of which the preferred species is polystyrene. Further description herein will be made with particular reference to the preferred polystyrene species, with the understanding that such description is applicable to the generic class of polyolefin compositions described herein.

The volatile foaming agent to be used in accordance with this invention is a mixture of from about 3 to about 70 weight percent monochloromonofluoromethane and from about 97 to about 30 weight percent dichlorodifluoromethane. Some of such mixtures are disclosed in U.S. Pat. No. 3,634,255 including the mixture comprising about 12 weight percent monochloromonofluoromethane and about 88 weight percent dichlorodifluoromethane which at 126 p.s.i.a. is an azeotropic composition, and including other mixtures comprising from about 1 to 25 weight percent monochloromonofluoromethane which are azeotrope-like and which behave essentially as the azeotrope.

Preferably, the blowing agent should comprise from about 5 to about 50 weight percent monochloromonofluoromethane and from about 95 to about 50 weight percent dichlorodifluoromethane; still preferably, from about 10 to about 35 weight percent monochloromonofluoromethane and from about 90 to about 65 weight percent dichlorodifluoromethane and most preferably, from about 10 to about 22 weight percent monochloromonofluoromethane and from about 90 to about 78 weight percent dichlorodifluoromethane.

A variety of nucleating agents may be employed as is well known to persons skilled in the art, such as are set forth in British Pat. No. 854,586 and U.S. Pat. No.

3,231,524. Such materials include, for example, inorganic substances such as talc, clay, silica, titanium oxide and zinc oxide, and organic substances such as metallic salts of fatty acids, such as barium stearate or aluminum stearate, or a combination of an organic acid such as tartaric acid, citric acid, oxalic acid or oleic acid and sodium carbonate or sodium bicarbonate. Such materials are required to control the cell size in the foam.

Extrusion techniques and procedures as well as conditions therefor, are well known in the art and need not be discussed in detail herein. Generally the extrudable composition is prepared by mixing the selected resin with a nucleating agent, heat plastifying the resin within an extruder, adding the blowing agent to the heat plastified material in the extruder and employing the extruder to admix the blowing agent with the heat plastified material. Alternatively the blowing agent may be incorporated within the polyolefin resin particles either during polymerization or by the steeping-in process as known in the art and subsequently passing the mixture to an extruder.

Generally the temperature of the heating zone of the extruder is maintained from about 250° to about 500° F., preferably from about 300° to about 450° F. and the pressure at which the blowing agent is blended into the resin should be from about 2,000–3,000 p.s.i. These ranges are not critical. They may be adjusted as required by those skilled in the art depending on choice of materials, properties desired and other factors. The various techniques for carrying out the extrusion of the foams are well known in the art and are illustrated, for example, in U.S. Pat. Nos. 2,917,217; 3,121,911 and 3,311,681.

The subject monochloromonofluoromethane/dichlorodifluoromethane blowing agent blends are nonflammable and, when used to prepare polyolefin foams in accordance with this invention, require up to about 10 weight percent less blowing agent for equivalent foam properties than is the case when dichlorodifluoromethane is used alone. An additional advantageous property obtained by using the novel blowing agents is that foams of high density may be produced. This results in foams with more desirable strength characteristics. Hence, higher tensile strengths may be obtained in the extruded foam products with the subject blowing agents of the invention than when dichlorodifluoromethane alone is used as the blowing agent. Significantly, use of the blowing agents of the invention provide greater flexibility of control as evidenced by the freedom of the operator to tolerate higher input/output screw ratios. This results in better control and mixing thereby permitting the production of a more uniform foam product. The blowing agents of the invention provide improved extrusion processability, thereby permitting greater polymer throughputs and resulting in less waste and less energy input to the process.

As is well known in the art, the polyolefin foams may be extruded in any suitable shape such as sheets, board stock and rods.

The following examples serve to illustrate the advantages of the use of the subject blowing agents in the preparation of the preferred embodiment of the invention, i.e. extruded polystyrene foam.

Unless otherwise indicated temperatures are in degrees Fahrenheit and all parts and percentages are by weight.

EXAMPLE 1

A number of foam polystyrene sheet samples were prepared using granular polystyrene (Sinclair-Koppers 8G) and dichlorodifluoromethane as blowing agent. The extrusion was conducted with a Gloucester "Extro" laboratory extruder (1.25" diameter; 24:1 length-/diameter ratio). This unit possesses two separate screw feed systems or extruders. A first input screw (1.25" diameter) feeds the polystyrene as it is melted to an expansion agent inlet port wherein the expansion agent is blended with the molten or heat plastified polystyrene by means of a mixing head attached to one end of the input screw. This blend is then fed to the output screw (1.25" diameter) through a melt coupling zone. While passing along the output screw, the blend is cooled to the desired extrusion temperature. Upon extrusion through an adapter and a die (1" diameter), the expansion agent vaporizes, creating the foam envelope. The extruded sheet is then stretched over a sizing mandrel (3.5" diameter), then cut and wound on take-up spools.

The nucleating agent used was a mixture of equal parts of citric acid and sodium bicarbonate. The granular polystyrene and nucleator were admixed (0.3 weight % nucleator) and fed to the extruder. Operating conditions for the runs were as follows:

| | |
|---|---|
| Input screw speed | 100 rpm |
| Output screw speed | 28 rpm |
| First Extruder Temperature | |
| Zone 1 | 300° |
| Zone 2 | 400° |
| Zone 3 | 450° |
| Coupling Zone Temperature | 365° |
| Second Extruder Temperature | |
| Zone 1 | 300° |
| Zone 2 | 295° |
| Adapter Zone Temperature | 280° |
| Die Zone Temperature | 280° |
| Melt Pressure, Coupling Zone | 2200 p.s.i. |
| Melt Pressure, Adapter Zone | 1550 p.s.i. |

EXAMPLE 2

This example demonstrates the improved properties of polystyrene foam obtained when a monochloromonofluoromethane/dichlorodifluoromethane blend in accordance with the invention was used in place of the dichlorodifluoromethane blowing agent.

The procedure of Example 1 was repeated except that a monochloromonofluoromethane/dichlorodifluoromethane blend (22/78 weight ratio) was used as the blowing agent in place of the dichlorodifluoromethane blowing agent of Example 1. The setting used for delivering the dichlorodifluoromethane blowing agent in Example 1 was not changed; thus, the rate of feed of the monochloromonofluoromethane/dichlorodifluoromethane blowing agent was equivalent to that feed of dichlorodifluoromethane blowing agent employed in the previous experiment.

Conditions which differed from those in Example 1 are reported below:

| | |
|---|---|
| Adapter Zone Temperature | 270° |
| Die Zone Temperature | 270° |
| Melt Pressure, Coupling Zone | 2100 p.s.i. |
| Melt Pressure, Adapter Zone | 1250 p.s.i. |

The melt pressure in the coupling zone was 2100 p.s.i. and 1250 p.s.i. in the adapter zone, notably lower than the corresponding pressures with dichlorodifluoromethane alone as reported in Example 1. The foam samples produced could be bent at a 90° angle without cracking.

EXAMPLES 3-25

A number of foam samples were prepared with the equipment and using the procedure described in Example 1, except that the polyolefin was granular polystyrene (Dow 685 Polymer) and the nucleating agent was 0.1% talc based on the polystyrene resin. The densities of the extruded polystyrene foam as a function of the amount of blowing agent used were determined for dichlorodifluoromethane blowing agent (Examples 3-16) and for 22/78 weight % blends of monochloromonofluoromethane with dichlorodifluoromethane (Examples 17-25). The results are reported in Table I below.

Densities were determined by a displacement procedure. A one quarter inch strip of foam was cut from an entire run roll. The strip was weighed, cut into sections and submerged in a granulated cylinder containing water. The volume of the foam was taken as the amount of water displaced. It was assumed that the weight of foam was much greater than the weight of the retained expansion agent. Thus, the strip weight was taken as the foam weight in the calculation of the density.

The level of blowing agent used was determined by actual measurement for each run. Coupled expansion agent feed cylinders were employed. One was used during stabilization of the run machine parameters. The other was put into service as the run was initiated. At completion of the run, the cylinder was shut off and weighed. The weight loss during the run was taken as the total amount of expansion agent used. This value is converted to weight percent by dividing the weight of the roll of foam produced during the run. The time for each run was 30 minutes.

TABLE I

| DENSITY VS. BLOWING AGENT LEVEL | | |
|---|---|---|
| Example | Density (Pounds/cubic ft) | Agent Level (wt %) |
| Dichlorodifluoromethane | | |
| 3 | 5.5 | 6.2 |
| 4 | 5.1 | 6.6 |
| 5 | 4.1 | 7.4 |
| 6 | 4.2 | 7.9 |
| 7 | 4.6 | 8.1 |
| 8 | 3.8 | 8.2 |
| 9 | 3.9 | 8.3 |
| 10 | 3.7 | 8.4 |
| 11 | 4.3 | 8.7 |
| 12 | 3.1 | 8.8 |
| 13 | 3.6 | 8.8 |
| 14 | 3.5 | 9.0 |
| 15 | 3.3 | 9.4 |
| 16 | 3.7 | 9.5 |
| 22 wt % Monochloromonofluoromethane/78 wt % Dichlorodifluoromethane | | |
| 17 | 6.2 | 4.3 |
| 18 | 6.8 | 5.0 |
| 19 | 4.8 | 6.2 |
| 20 | 4.5 | 6.6 |
| 21 | 4.0 | 7.2 |
| 22 | 3.6 | 7.8 |
| 23 | 3.3 | 8.5 |
| 24 | 3.3 | 8.7 |
| 25 | 2.8 | 9.7 |

The results shown in the above Table I clearly indicate that a lower weight percentage of blowing agent is required to obtain comparable foam densities when the blowing agent is the 22 weight percent monochloromonofluoromethane/dichlorodifluoromethane blend as compared with dichlorodifluoromethane alone.

Similar results are obtained when other monochloromonofluoromethane/dichlorodifluoromethane blends within the scope of the invention are employed.

EXAMPLE 26-36

The procedure of Examples 3-25 was followed, except that to assess extrusion processability, the input speeds were varied and temperature and resulting pressures were as indicated in the following Table II.

TABLE II

| EFFECT OF INPUT/OUTPUT SCREW SPEEDS ON OPERATING PRESSURE AND TEMPERATURE | | | |
|---|---|---|---|
| Example | Input/Output Screw Speed (RPM) | Temp (°F.) First Extruder Zone #1 | Pressure (psi) Melt Coupling Zone |
| Dichlorodifluoromethane | | | |
| 26 | 45/15 | 310 | 2000 |
| 27 | 52/15 | 315 | — |
| 28 | 56/15 | 320 | 2800 |
| 29 | 56/15 | 318 | — |
| 30 | 63/15 | 330 | 3200 |
| 31 | 72/15 | 340 | 3900 |
| 22 wt % Monochloromonofluoromethane/78 wt % Dichlorodifluoromethane | | | |
| 32 | 56/15 | 315 | 2200 |
| 33 | 63/15 | 320 | 2750 |
| 34 | 72/15 | 325 | 3000 |
| 35 | 81/15 | 330 | 3500 |
| 36 | 90/15 | 340 | 3700 |

The effect of input/output screw speeds on operating pressure and temperature is demonstrated in Table II.

The data in Table II show that the blowing agent blend of the invention operates at distinctly lower pressures and temperatures than dichlorodifluoromethane alone as blowing agent. This is particularly significant when it is considered that with dichlorodifluoromethane alone the input/output screw ratio was limited because the extruder was shut down when the safe operating pressure (3,900 p.s.i.) was exceeded. Thus, the data in the table show that processability is improved when the blowing agent blends of the invention are employed, since lower operating temperatures and pressures are possible thereby allowing a more accurate control of the process parameters.

Similar results are obtained when other monochloromonofluoromethane/dichlorodifluoromethane blends within the scope of the invention are employed.

We claim:

1. In the process for the preparation of polyolefin foams comprising blending a thermoplastic polyolefin with a nucleating agent and a volatile foaming agent, and extruding said composition into a region of lower pressure to cause foaming;

the improvement which comprises employing as the volatile foaming agent, a mixture comprising from about 3 to about 70 weight percent monochloromonofluoromethane and from 97 to about 30 weight percent dichlorodifluoromethane.

2. The process according to claim 1 in which the polyolefin is a monovinyl aromatic compound of the formula Ar—CH=CH$_2$ wherein Ar is an aromatic hydrocarbon radical of the benzene series or an aromatic halohydrocarbon of the benzene series with up to 10 weight percent of another readily copolymerizable olefinic compound.

3. The process according to claim 2 wherein the polyolefin is polystyrene.

4. The process according to claim 3 in which the volatile foaming agent comprises from about 5–50 weight percent monochloromonofluoromethane and from about 95 to about 50 weight percent dichlorodifluoromethane.

5. The process according to claim 4 wherein the volatile foaming agent comprises from about 10–35 weight percent monochloromonofluoromethane and from about 90–55 weight percent dichlorodifluoromethane.

6. The process according to claim 5 wherein the volatile blowing agent comprises from about 10–22 weight percent monochloromonofluoromethane and from about 90–78 weight percent dichlorodifluoromethane.

* * * * *

UNITED STATES PATENT AND TRADEMARK OFFICE
CERTIFICATE OF CORRECTION

PATENT NO. : 4,228,246

DATED : October 14, 1980

INVENTOR(S) : Taub et al.

It is certified that error appears in the above-identified patent and that said Letters Patent are hereby corrected as shown below:

Column 1, line 29: "as" should read -- is --.

Column 8, line 7: "blowing" should read -- foaming --.

Signed and Sealed this

Twenty-third Day of June 1981

[SEAL]

Attest:

RENE D. TEGTMEYER

Attesting Officer     Acting Commissioner of Patents and Trademarks